United States Patent
Arakawa et al.

(10) Patent No.: US 8,710,781 B2
(45) Date of Patent: Apr. 29, 2014

(54) POWER CONVERSION DEVICE AND METHOD FOR CONTROLLING THEREOF

(75) Inventors: Yoichiro Arakawa, Hitachi (JP); Koichiro Nagata, Mito (JP); Yuusuke Arao, Narashino (JP); Shigehisa Aoyagi, Hitachi (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 329 days.

(21) Appl. No.: 13/147,807

(22) PCT Filed: Feb. 17, 2010

(86) PCT No.: PCT/JP2010/000961
§ 371 (c)(1),
(2), (4) Date: Aug. 4, 2011

(87) PCT Pub. No.: WO2010/103733
PCT Pub. Date: Sep. 16, 2010

(65) Prior Publication Data
US 2011/0292700 A1  Dec. 1, 2011

(30) Foreign Application Priority Data
Mar. 9, 2009 (JP) ................. 2009-054834

(51) Int. Cl.
*H02P 6/00* (2006.01)
(52) U.S. Cl.
USPC ....................... 318/400.29; 363/41
(58) Field of Classification Search
USPC .............. 363/16–17, 34–41, 49, 55, 56.01, 363/56.02, 97, 98, 132, 89; 318/400.02, 318/400.04, 580, 800–810, 147, 400.29
See application file for complete search history.

(56) References Cited

U.S. PATENT DOCUMENTS 5,569,995 A * 10/1996 Kusaka et al. ............... 318/717
5,790,396 A *  8/1998 Miyazaki et al. ............ 363/96
(Continued)

FOREIGN PATENT DOCUMENTS

JP        8-19263      1/1996
JP      2001-327173   11/2001
(Continued)

*Primary Examiner* — Rajnikant Patel
(74) *Attorney, Agent, or Firm* — Antonelli, Terry, Stout & Kraus, LLP.

(57) ABSTRACT

In a power conversion device that includes a PWM converting means for generating a PWM pulse by comparing three-phase voltage commands with a triangular wave carrier signal, a power converter for converting between a DC voltage and a three-phase AC voltage by driving a switching element according to the PWM pulse, a current detecting means for detecting a pulsed current flowing through a DC bus conductor of a main circuit, and a voltage command correcting means for correcting three-phase voltage commands, which corrects the three-phase voltage commands so that a line voltage value between the maximum phase and an intermediate phase and a line voltage value between the intermediate phase and the minimum phase are each equal to or larger than a predetermined value, the maximum phase, intermediate phase, and minimum phase being determined in correspondence to momentary values of the three-phase voltage commands arranged in descending order, if the voltage command is outside an allowable upper limit or lower limit, not only the voltage command for the maximum phase and/or the minimum phase but also the voltage command for the intermediate phase are corrected.

Accordingly, the inability to detect a current due to a restriction imposed by an upper limit or a lower limit for an output voltage is eliminated, and highly precise control of the power conversion device is achieved independently of the situation.

11 Claims, 10 Drawing Sheets

(56) References Cited

U.S. PATENT DOCUMENTS

| | | | |
|---|---|---|---|
| 6,140,789 A * | 10/2000 | Kachi et al. | 318/603 |
| 7,068,326 B2 * | 6/2006 | Choi et al. | 348/614 |
| 7,759,888 B2 * | 7/2010 | Matsui et al. | 318/400.29 |
| 2004/0131114 A1 | 7/2004 | Ishida et al. | |
| 2009/0040797 A1 | 2/2009 | Ishida et al. | |

FOREIGN PATENT DOCUMENTS

| | | | |
|---|---|---|---|
| JP | 2001-371173 | * | 11/2001 |
| JP | 2004-201440 | | 7/2004 |
| JP | 3664040 | | 4/2005 |
| JP | 2005-253229 | | 9/2005 |
| JP | 2008-131770 | | 6/2008 |

* cited by examiner

POWER CONVERSION DEVICE AND METHOD FOR CONTROLLING THEREOF

FIELD OF THE INVENTION

The present invention relates to a power conversion device that detects DC bus conductor current and obtains phase current information and to a method of controlling the power conversion device.

BACKGROUND OF THE INVENTION

Power conversion devices, typified by inverters, use pulse width modulation (PWM) to achieve a DC to AC conversion or AC to DC conversion function. Inverters are used in, for example, driving systems for synchronous motors, induction motors, and other AC motors (referred to below as motors).

A power conversion device for driving a motor needs a means for detecting phase current to achieve precise control. Recently, methods of obtaining information about AC current flowing in a motor from DC bus current in a power conversion device, without having to use an external current detecting means such as a current sensor, are proposed in, for example, Patent Document 1, Patent Document 2, and Patent Document 3. These technologies eliminate the need to use a specific current sensor, so the number of parts in a device and thereby reduction in space and manufacturing costs becomes possible.

PRIOR ART DOCUMENTS

Patent Documents

Patent Document 1: Japanese Patent Laid-open No. Hei 8 (1996)-19263
Patent Document 2: Japanese Patent No. 3664040
Patent Document 3: Japanese Patent Laid-open No. 2008-131770

SUMMARY OF THE INVENTION

First, for the sake of the description that follows, when the momentary values of three-phase voltage commands are arranged in a descending order, the phase having the largest value is referred to below as the maximum phase, the phase having the second largest value is referred to below as the intermediate phase, and the phase having the third largest value is referred to below as the minimum phase.

In Patent Document 2, to obtain phase current information, one cycle of a triangular wave carrier signal, from which a PWM signal is generated, is divided into a first half and a latter half, and addition or subtraction of a predetermined value to or from a phase voltage command value is carried out in the first half period or latter half period so that a flow time of the phase current flowing through a DC bus conductor in a pulsed state is temporarily prolonged. Then, phase current information is obtained by widening a line voltage value and temporarily prolonging the flow time of the phase current flowing in a pulsed shape through the DC bus conductor (the phase current is referred to below as the pulsed current).

In correction for the voltage command, addition of a correction amount to the maximum phase or subtraction of it from the minimum phase has been assumed to be the best mode.

With a PWM pulse generator, however, an upper limit and a lower limit are generally set for the voltage command value, which is compared with the triangular wave carrier signal, for each phase; when the correction amount is added, the upper limit or lower limit may be exceeded. When this happens, a sufficient flow time cannot be assured for the pulsed current and a period during which the current cannot be detected occurs, causing a problem in that motor control precision is lowered.

The above situation occurs when the absolute value of the voltage command value before correction is large and even a small correction amount causes the upper limit or lower limit to be exceeded as in a case in which, for example, a motor is rotating at high speed, or when a necessary correction amount is large. The correction amount is large when, for example, the carrier frequency is high, or ringing noise, which is generated at the rising of the pulsed current and causes detection error, lasts for a long period of time.

Recently, motors increasingly tend to be highly efficient and compact and to generate less noise, and the above situation is thereby more likely to occur because, for example, the voltage saturation area is used and the carrier frequency is increased.

Although Patent Document 3 proposes a method of correcting three-phase voltage commands to suppress detection error caused by a current ripple that is generated due to PWM switching, there is no description about a state in which detection is not possible due to an upper limit and a lower limit for a voltage.

An object of the present invention is to provide a power conversion device that achieves phase current detection, based on a DC bus conductor, in which a restriction due to an upper limit or a lower limit for a voltage command value does not prevent current detection and enables stable, highly precise operation of a motor and to provide a method of controlling the power conversion device.

In a power conversion device that includes a pulse width modulating means for converting three-phase voltage commands to a PWM pulse by comparing the voltage commands with a triangular wave carrier signal, a power converter for converting between a DC voltage and a three-phase AC voltage by driving a switching element according to the PWM pulse, a current detecting means for detecting a pulsed current flowing through a DC bus conductor of a main circuit in the power converter, and a voltage command correcting means for correcting voltage commands for a maximum phase and a minimum phase so that line voltages between the maximum phase and an intermediate phase and between the intermediate phase and the minimum phase are each equal to or larger than a predetermined value, the maximum phase being a phase having the largest value when the momentary values of the three-phase voltage commands are arranged in a descending order, the intermediate phase being a phase having the second largest value, the minimum phase being a phase having the third largest value, one aspect of the present invention includes a voltage command correcting means for correcting not only the voltage command for the maximum phase and/or the minimum phase but also the voltage command for the intermediate phase, under a predetermined condition.

In a preferred embodiment of the present invention, the predetermined condition is set when a deviation from an upper limit or a lower limit for the voltage command value occurs as a result of correcting the voltage command value for the maximum phase or minimum phase.

In another preferred embodiment of the present invention, an arrangement is made so that the voltage command correcting means corrects the voltage command by taking a half of a triangular wave carrier signal cycle as a unit cycle and that the average of voltage command correction amounts in a period extending over an integer multiple of the unit cycle is zero or substantially zero.

In yet another preferred embodiment of the present invention, an arrangement is made so that a period during which the average of the voltage command correction amounts is zero or substantially zero is set to an odd multiple of the unit cycle and current is detected in the unit cycle at the center thereof.

The preferred embodiments of the present invention can provide a power conversion device that achieves phase current detection, based on a DC bus conductor, in which a restriction due to an upper limit or a lower limit for a voltage command value does not prevent current detection and enables stable, highly precise operation of a motor, and can provide a method of controlling the power conversion device.

The preferred embodiments of the present invention can appropriately achieve current detection even under operation conditions in adverse environments in which, for example, high-speed operation is carried out, the triangular wave carrier frequency is high, and ringing noise lasts for a long period of time; under these conditions, current detection from a DC bus conductor is not possible in the conventional method.

Other objects and features of the present invention will be clarified in the embodiments described below.

DESCRIPTION OF THE PREFERRED EMBODIMENTS

Embodiments of the present invention will be described below in detail with reference to the drawings.

First Embodiment

Figure 1:
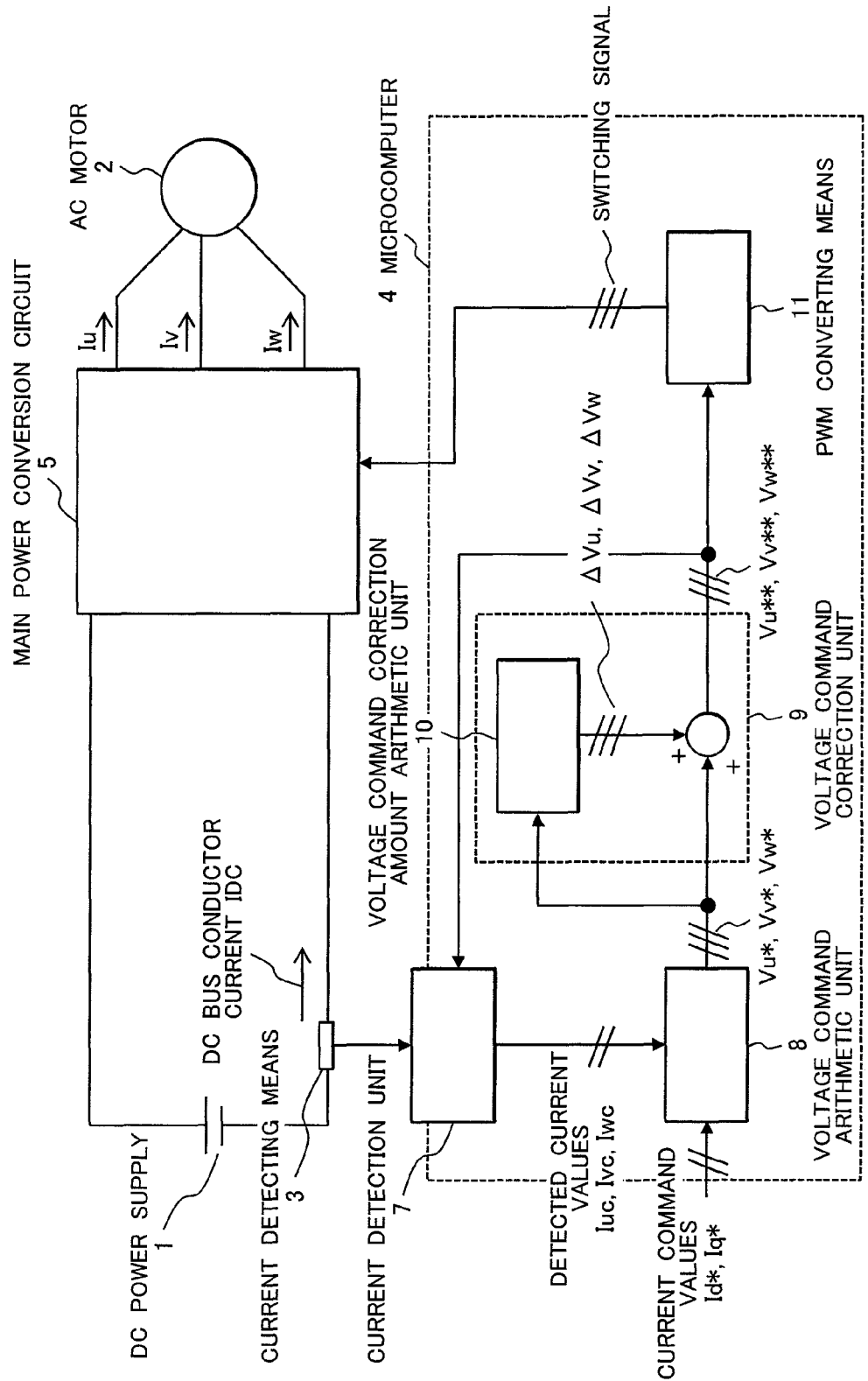
FIG. 1 is the entire structure of a power conversion device according to a first embodiment of the present invention.

FIG. 1 is the entire structure of a power conversion device according to a first embodiment of the present invention. In FIG. 1, the interior of a microcomputer 4 indicates information flows and other portions indicate electric circuits (actual current flows).

In this embodiment, there are provided a DC power supply 1, a current detecting means 3 connected to a DC bus conductor, the microcomputer 4 that outputs a PWM signal on the basis of current information obtained from the current detecting means 3, a main power conversion circuit 5 that converts the electric power of the DC power supply 1 to AC electric power according to the PWM signal, and an AC motor 2 that works by using the converted electric power.

The microcomputer 4 has a current detecting part 7 that receives a DC bus conductor current IDC signal detected by the current detecting means 3, reproduces three-phase equilibrium currents Iuc, Ivc, and Iwc, and outputs these currents. The microcomputer 4 also has a voltage command arithmetic unit 8 that receives the three-phase equilibrium currents Iuc, Ivc, and Iwc and current commands Iu*, Iv*, and Iw* that are arbitrarily supplied from the outside (the suffix * indicates a command value in the following description), calculates first three-phase voltage commands Vu*, Vv*, and Vw*, and outputs these commands. The current commands Iu*, Iv*, and Iw* may be converted to a rotation coordinate system and the resulting Id* and Iq* may be given instead. The microcomputer 4 also has a voltage command correction amount arithmetic unit 10 that calculates voltage command correction amounts ΔVu, ΔVv, and ΔVw from the first three-phase voltage commands Vu*, Vv*, and Vw* and a voltage command correction unit 9 that calculates second three-phase voltage commands Vu, Vv, and Vw by an addition of the first voltage commands and the voltage command correction amounts. The microcomputer 4 further has a PWM converting means 11 that performs PWM to convert the finally obtained second three-phase voltage commands Vu, Vv, and Vw to a switching signal.

The main power conversion circuit 5 converts the electric power of the DC power supply 1 to AC electric power and supplies three-phase equilibrium currents Iu, Iv, and Iw to the AC motor, according to the switching signal. Since the phase currents flow through the DC bus conductor according to the switching state of the main power conversion circuit 5, pulsed phase current flows in the DC bus conductor current. The current detection unit 7 determines whether phase current detection from the second voltage command values is possible; if the detection is possible, the current detection unit 7 sets a time at which to detect a phase current and performs current detection, determines the phase corresponding to the detected current, and reconstructs Iuc, Ivc, or Iwc from the detected IDC.

Next, the voltage command correction unit 9, which is a feature in this embodiment, will be described.

Figure 2:
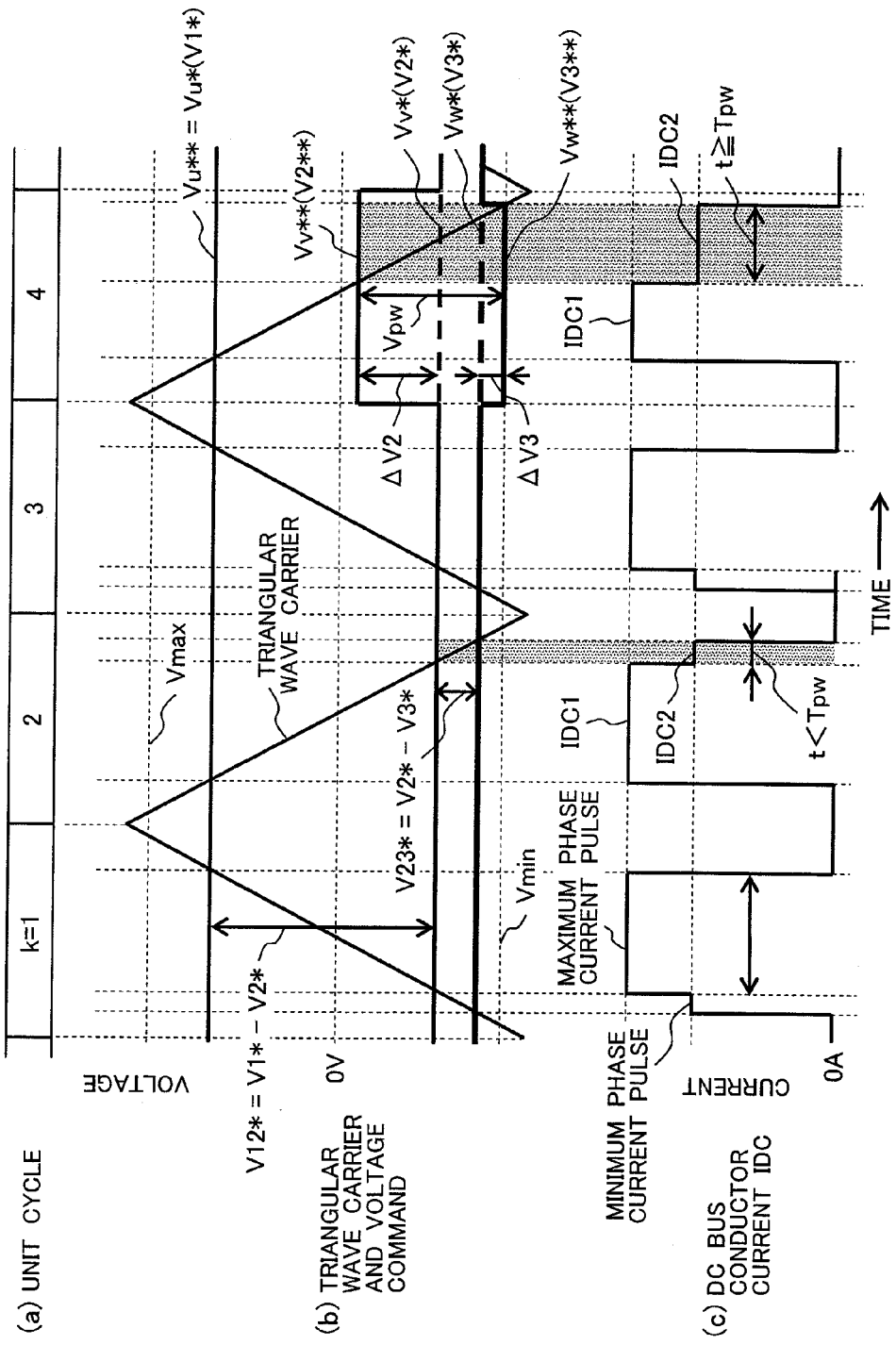
FIG. 2 illustrates a relation between DC bus conductor current and three-phase voltages in the first embodiment of the present invention.

FIG. 2 illustrates a relation between the DC bus conductor current and three-phase voltages in the first embodiment of the present invention, schematically representing a triangular wave carrier signal and a DC bus conductor current waveform. One cycle of the triangular wave carrier is formed with a monotone increasing period of a triangular wave, which is a half cycle, and its monotone decreasing period, which is also a half cycle. It is known that, in the DC bus conductor current IDC, phase current information for two phases appears in a pulse state in each half cycle of a triangular wave carrier (the cycle will be referred to below as the unit cycle). Obtained current phases are the maximum voltage phase and the minimum voltage phase in the unit cycle; as shown in FIG. 2, the sequence in which pulses appear is changed between the monotone increasing period (k=1, 3) of the triangular wave carrier and its monotone decreasing period (k=2, 4). In FIG. 2, the current values for two phases, which are detected by the current detecting means 3 in each unit cycle, are denoted IDC1 and IDC2 in the order in which the current values are detected.

Although the phase current information obtained from the DC bus conductor current in the unit cycle is only for two phases of the three-phase AC current, since the three-phase AC currents Iu, Iv, and Iw are equilibrium currents, the sum of Iu, Iv, and Iw is always 0. Therefore, information for the remaining one phase is obtained from the other two phases.

The maximum of the three-phase voltage commands at each moment will be denoted V1 as the maximum phase, the minimum will be denoted V3 as the minimum phase, and the intermediate command will be denoted V2 as the intermediate phase. The corresponding phase currents will be denoted as I1, I2, and I3. In FIG. 2, Vu, Vv, and Vw are larger in that order, so V1 equals Vu, V2 equals Vv, and V3 equals Vw.

In each unit cycle, the flow times (referred to below as the current pulse widths) of the maximum voltage phase current I1 and minimum voltage phase current I3 that appear in the DC bus conductor current are determined depending on the line voltage values of V1 and V3 relative to the intermediate phase voltage V2. That is, as is clear from the unit cycles before correction (k=1, 2) in FIG. 2, the flow time of the minimum phase current pulse is determined by $V23^* = V2^* - V3^*$ and the flow time of the maximum phase current pulse is determined by $V12^* = V1^* - V2^*$.

To perform current detection from the pulsed current, the current pulse width must be equal to or greater than a predetermined value. The predetermined value is a minimum value determined in consideration of a dead time provided to prevent an arm short in a semiconductor device, a period during which ringing noise is generated, or the sample hold time of the A/D converter. It can be considered that the predetermined value is determined under hardware restrictions. The minimum value of the current pulse width that enables current detection is defined as a minimum pulse width Tpw.

In FIG. 2, when k is 2, V12 is adequately large but V23 is small, so IDC1 can be detected but IDC2 cannot be detected because its flow time t is smaller than the minimum pulse width Tpw (t<Tpw).

In summary, the condition under which phase current detection from the DC bus conductor current IDC is possible is represented by equation (1) below.

$$V12 \geq Vpw \text{ and } V23 \geq Vpw \quad (1)$$

where the necessary line voltage Vpw is the line voltage equivalent to the minimum pulse width Tpw. An object of the voltage command correction unit 9 at the time of current detection is to correct the voltage command value so that the second voltage command satisfies equation (1) when the first voltage command does not satisfy equation (1).

Next, the voltage command correction calculation, which is most characteristic in the present invention, will be described.

Figure 3:
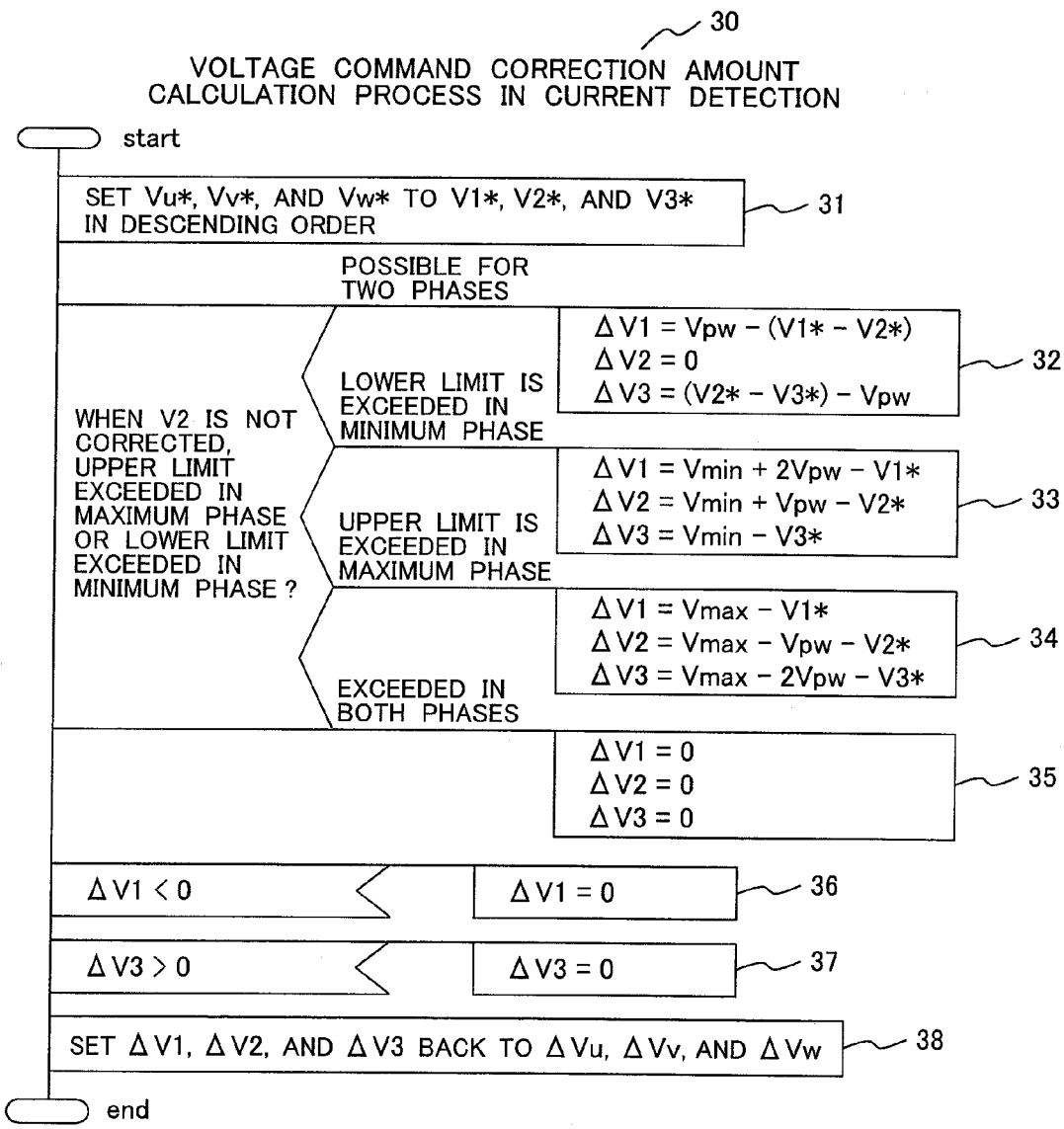
FIG. 3 illustrates a processing flow in a voltage command correction amount arithmetic unit in the first embodiment of the present invention.

FIG. 3 illustrates a processing flow in a voltage command correction amount arithmetic unit in the first embodiment of the present invention. When a voltage command correction amount calculation process 30 is called at intervals of a predetermined cycle during current detection, the first voltage commands Vu*, Vv*, and Vw* that have been entered are defined as V1*, V2*, and V3* sequentially from the command having the largest value (process 31). It is checked whether the upper output voltage limit Vmax or lower output voltage limit Vmin will be exceeded if the maximum phase voltage V1* and minimum phase voltage V3* are corrected so that equation (1) is satisfied. Vmax and Vmin are given as, for example, the maximum voltage and minimum voltage that the main power conversion circuit 5 can output, the maximum voltage and minimum voltage being determined from the voltage of the DC power supply 1.

When a correction amount $\Delta V1$ is added to V1* so that equation (1) is satisfied, for example, $\Delta V1$ and $\Delta V3$ are determined so that equation (2) and equation (3) are satisfied.

$$V1^{**} - V2^* = (V1^* + \Delta V1) - V2^* \geq Vpw \quad (2)$$

$$V2^* - V3^{**} = V2^* - (V3^* + \Delta V3) \geq Vpw \quad (3)$$

If the maximum value of the output voltage is limited to Vmax or more and its minimum value is limited to Vmin or less, however, the equation below must be satisfied.

$$V1^{**} < Vmax \quad (4)$$

$$V3^{**} > Vmin \quad (5)$$

These conditions are rewritten as follows:

$$V2^* + Vpw < Vmax \quad (6)$$

$$V2^* - Vpw > Vmin \quad (7)$$

If equation (6) is not satisfied, the second voltage command value V1 exceeds Vmax and thereby the maximum phase current cannot be detected. Similarly, if equation (7) is not satisfied, the second voltage command value V3 falls below Vmin and thereby the minimum phase current cannot be detected.

If both equations (6) and (7) are satisfied, it is only necessary to calculate $\Delta V1$ and $\Delta V3$ that satisfy equations (2) and (3); usually, $\Delta V1$ and $\Delta V3$ are set to the minimum values that satisfy equations (2) and (3) (process 32).

If only equation (7) is not satisfied, any $\Delta V3$ that satisfies equation (3) causes V3** to fall below Vmin. Therefore, Vpw or more cannot be assured for V23*, preventing detection of the minimum phase current.

Accordingly, in this embodiment, to assure Vpw, V3** is set to Vmin and a value by which V23* is smaller than Vpw is added to V2*. In this case, as V2* is increased, V12* is decreased, so equation (1) may not be satisfied. Therefore, V1* is also corrected until it becomes a value that enables Vpw to be assured from V2** (process 33).

Similarly, if only equation (6) is not satisfied, V1** is set to Vmax a value by which V12* is smaller than Vpw is subtracted from V2* to assure Vpw (process 34).

If neither equation (6) nor equation (7) is satisfied, $\Delta V1$, $\Delta V2$, and $\Delta V3$ are set to 0 and current detection is aborted (process 35).

If $\Delta V1$ and $\Delta V3$ calculated in the above processes satisfy equations (8) and (9), the condition originally satisfies equation (1) without correction.

$$\Delta V1 < 0 \quad (8)$$

$$\Delta V3 > 0 \quad (9)$$

Accordingly, $\Delta V1$ may be set to 0 and $\Delta V3$ may be set to 0 (processes 36 and 37).

Process 31 is executed reversely to set $\Delta V1$, $\Delta V2$, and $\Delta V3$ calculated last back to $\Delta Vu$, $\Delta Vv$, and $\Delta Vw$ and return them to the arguments, completing the process.

Since the second three-phase voltage commands satisfy all of equations (1), (4), and (5) due to these processes, appropriate current detection can be achieved and the voltage command correction amount can be minimized.

An example of the above operation in the first embodiment is illustrated in the unit cycle denoted by k=4 in FIG. 2. In this example, the minimum phase voltage Vw* (V3*) is corrected with ΔV3, and the correction with ΔV2 is also added to Vv* (V2*) according to the present invention. As a result, the pulse width t of the current IDC2 is prolonged to Tpw or more, enabling current detection.

Next, advantages of the present invention will be described.

As proposed in Patent Document 2, it has been assumed that the best mode to satisfy equation (1) in voltage command correction is to perform voltage command correction in a direction in which the absolute value of the maximum phase voltage V1* or minimum phase voltage V3* is increased (in a direction away from the intermediate phase voltage V2*). This is because when V2* is changed, one current pulse width is increased, but there is the demerit that another current pulse width is decreased.

If, however, (1) the absolute value of V1* or V3* is large or (2) the line voltage Vpw necessary to assure the minimum pulse width Tpw is large, margins to the upper voltage limit Vmax and the lower limit Vmin are small and Vpw cannot be assured.

An example of the above case (1), in which V1* or V3* is large, is a case in which the speed of the AC motor 2 is high. In this case, since the internal electromotive force is large, the first voltage command becomes large. Thus, the present invention is particularly useful when a motor is run at high speed.

An example of the above case (2), in which Vpw is large, may be a case in which the carrier frequency is high. Under a high-frequency carrier condition, the minimum line voltage Vpw becomes large even when the minimum pulse width Tpw is the same. This is clarified by considering that the inclination of the triangular wave carrier in FIG. 2 becomes steep as the carrier frequency is increased. The present invention is effective for a trend toward high carrier frequencies to respond to recent demands for increasingly low loss in semiconductors and to recent users' growing need for low noise.

Adverse conditions in ringing noise environments may be considered as other situations in which Vpw is large.

A time during which high-frequency ringing noise, which appears in pulsed current during a switching operation of a semiconductor, lasts changes depending on the environment in which the device is installed, so Vpw is also changed accordingly. The present invention is effective in relation to applicability to various environments.

According to this embodiment, the voltage command correction unit 9 adds correction amounts to the maximum phase and minimum phase of the voltage command values with a half cycle of a triangular wave carrier taken as the unit cycle. If an upper limit or lower limit is exceeded as a result, the surplus is added to the intermediate phase to assure a line voltage necessary for current correction. Accordingly, highly precise current detection becomes possible even under a condition in which current detection has been not possible due to the upper and lower voltage limits. That is, highly precise control becomes possible in various environments in which, for example, a motor is run at high speed, the triangular wave carrier frequency is high, and the ringing noise environment is adverse.

Second Embodiment

Figure 4:
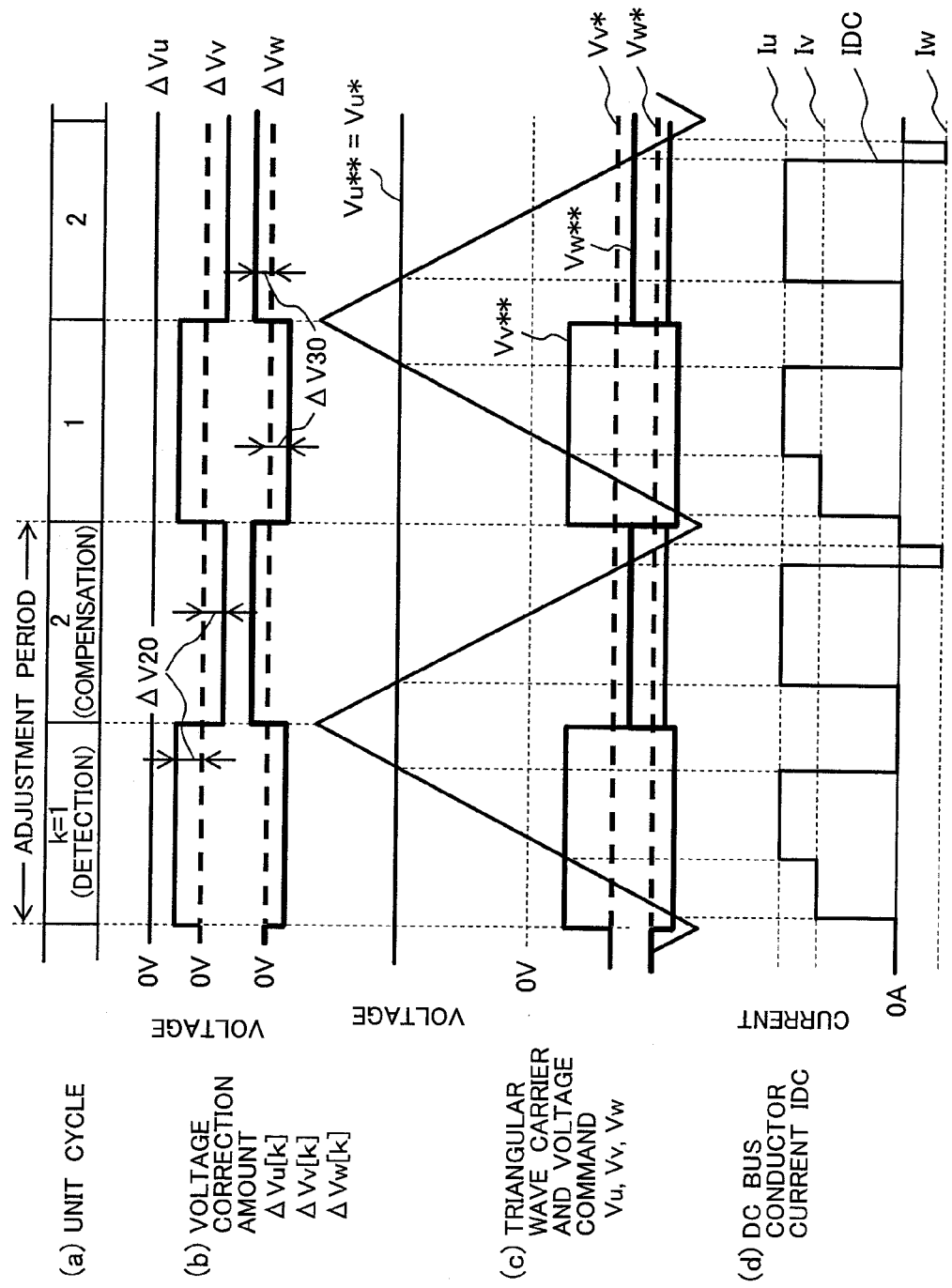
FIG. 4 illustrates a relation between DC bus conductor current and three-phase voltages in a second embodiment of the present invention.

FIG. 4 illustrates a relation between the DC bus conductor current and three-phase voltages in a second embodiment of the present invention. Features of the second embodiment will be described with reference to this drawing. In this embodiment, the voltage command correction amount added in current detection as in the first embodiment is compensated in a period during which current detection is not carried out. Then, the second voltage command and first voltage command can be made the same, enabling a normal operation to be maintained. As for a compensation method, considering a period equal to N times the unit cycle as an adjustment period, as proposed in Patent Documents 2 and 3, correction amounts in a period during which current detection is not carried out may be set so that the average of correction amounts in all phases in the adjustment period is zero or substantially zero. In this embodiment, however, the intermediate phase is also corrected, so a problem arises in that the upper or lower voltage limit is exceeded during compensation. In this embodiment, countermeasures against this problem will be described. The letter N is a natural number.

For convenience of explanation, ordinal number k (=1, 2, 3, - - - N) is assigned to each unit cycle in the adjustment period when the adjustment period is N. In this case, the voltage command correction amounts in each unit cycle are assumed to be ΔV1[k], ΔV2[k], and ΔV3[k]. Since current detection is carried out in at least one of the N unit cycles, this unit cycle will be referred to as a detection period, and each of the remaining periods will be referred to as a compensation period. It will be assumed here that the detection period appears once in the adjustment period. The method of calculating V1[k], V2[k], and V3[k] is as described in the first embodiment. The voltage command correction amounts in this current adjustment will be assumed here to be ΔV10, ΔV20, and ΔV30. To set the time average of the command correction amounts in the adjustment period to zero or substantially zero, the command correction amounts must satisfy the following relations for all phases.

$$\Sigma\_k=1 \text{ to } N \Delta V1[k]=0 \tag{10}$$

$$\Sigma\_k=1 \text{ to } N \Delta V2[k]=0 \tag{11}$$

$$\Sigma\_k=1 \text{ to } N \Delta V3[k]=0 \tag{12}$$

On the assumption that detection is carried out once in the adjustment cycle, for example, the following equations are set in the unit cycles assigned ordinal numbers in the compensation period.

$$\Delta V1[k] = -\Delta V10/(N-1) \tag{13}$$

$$\Delta V2[k] = -\Delta V20/(N-1) \tag{14}$$

$$\Delta V3[k] = -\Delta V30/(N-1) \tag{15}$$

Although, in equations (13) to (15), the values of k in ΔV1[k], ΔV2[k], and ΔV3[k] have been assumed to be the same, these values may be different if equations (10) to (12) are satisfied. For example, the compensation amounts in the compensation period before the detection period may have large values and these values may be reduced after the detection period.

There is a further problem in that the second voltage command exceeds the upper voltage limit or falls below the lower limit. To prevent this, ΔV1[k], ΔV2[k], and ΔV3[k] must be set so that the conditions indicated in equations (16) to (18) are satisfied for all values of the ordinal number k.

$$V1^* + \Delta V1[k] < V\text{max},\ V1^* + \Delta V1[k] > V\text{min} \tag{16}$$

$$V2^* + \Delta V2[k] < V\text{max},\ V2^* + \Delta V2[k] > V\text{min} \tag{17}$$

$$V3^* + \Delta V3[k] < V\text{max},\ V3^* + \Delta V3[k] > V\text{min} \tag{18}$$

In the detection period (k=1), however, equations (16) to (18) are satisfied because the voltage command correction amounts are determined as described in the first embodiment. Therefore, only the compensation period is problematic. In view of this, if ΔV1[k], ΔV2[k], and ΔV3[k] do not satisfy equations (16) to (18), it is decided that detection is impossible, and neither voltage command correction nor current detection is carried out.

As a specific example, a case in which N is 2 as illustrated in FIG. 4 will be described. In FIGS. 4, V23*(=V2*−V3*) is smaller than Vpw. Since equation (1) is not satisfied, therefore, phase current cannot be detected without alteration. It is assumed that when k is 1, the detection cycle takes place.

In the unit cycle for which k is 1, when $\Delta V23^{**}$ is set to Vpw by setting $\Delta V1[1]$ to $\Delta V10$, setting $\Delta V2[1]$ to $\Delta V20$, and setting $\Delta V3[1]$ to $\Delta V30$, as described in the first embodiment, phase current information is obtained ($\Delta V10$ is 0, here). The compensation amounts obtained here are saved and the voltage command correction amounts $\Delta V2[2]$ and $\Delta V3[2]$ are calculated in the next unit cycle for which k is 2. Since N is 2, $\Delta V1[2]$ is $-\Delta V10$, $\Delta V2[2]$ is $-\Delta V20$, and $\Delta V3[2]$ is $-\Delta V30$. Furthermore, it is determined whether $\Delta V1$, $\Delta V2$, and $\Delta V3$ satisfy equations (16) to (18).

If any one of equations (16) to (18) is not satisfied, it is decided that detection is impossible, and neither correction nor detection is carried out. A case in which compensation is impossible can be decided in advance in this process, so an abnormal operation of the motor due to inappropriate compensation can be avoided.

Although, in this embodiment, a monotone increasing period of the triangular wave carrier signal has been the detection period (k=1), a monotone decreasing period may be the detection period.

Third Embodiment

Figure 5:
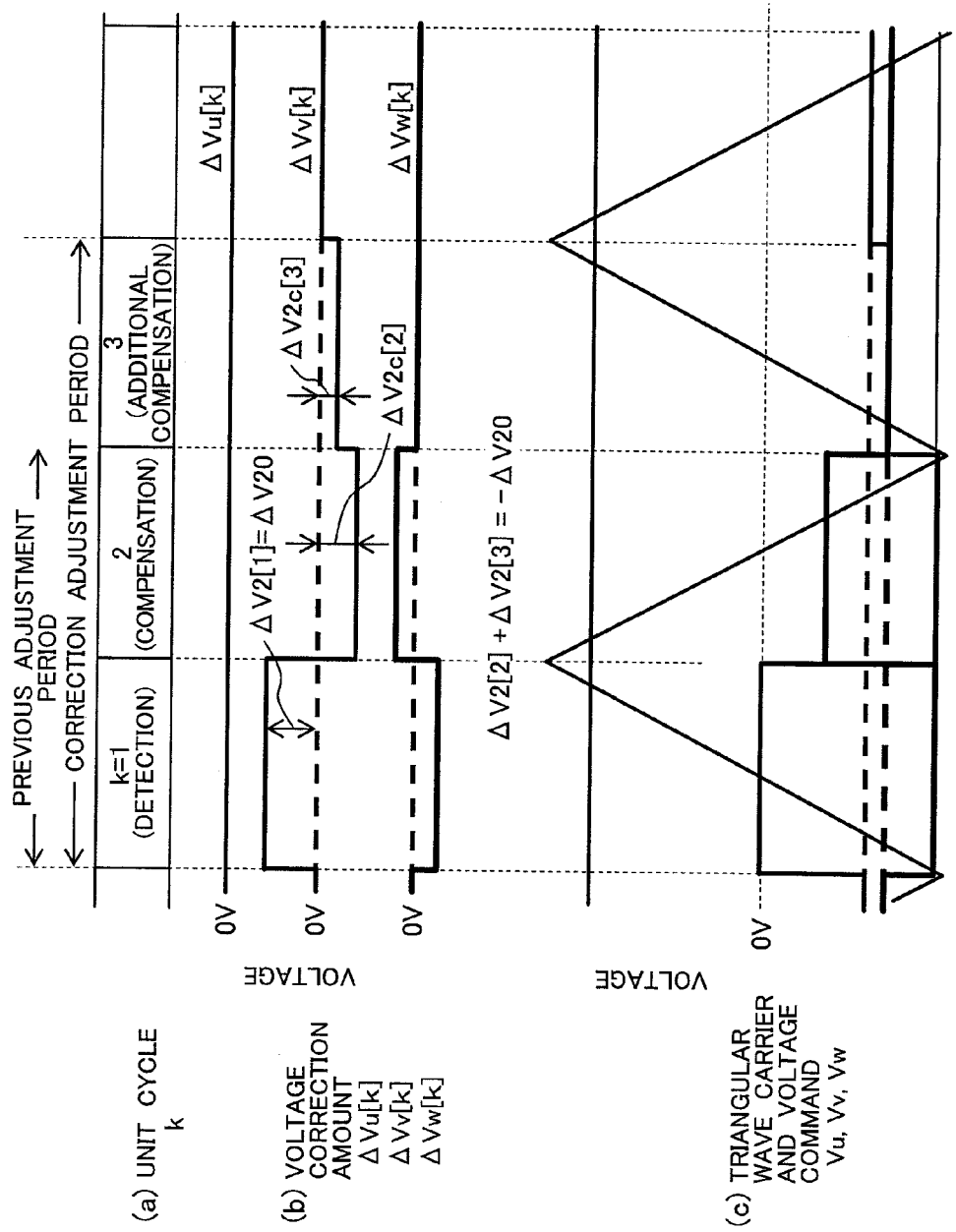
FIG. 5 illustrates a relation between DC bus conductor current and three-phase voltages in a third embodiment of the present invention.

FIG. 5 illustrates a relation between the DC bus conductor current and three-phase voltages in a third embodiment of the present invention. The third embodiment will be described for differences from the second embodiment, with reference to this drawing. In the third embodiment, if equations (16) to (18) are not satisfied, N is temporarily increased until equations (16) to (18) are satisfied so that detection can be carried out.

In FIG. 5, the compensation amount $\Delta V20$ is significantly large and the sum of V2 and $\Delta V2[2]$ falls below Vmin when k is 2. Therefore, the adjustment period is temporarily prolonged to compensate for the compensation amount that has been left in the next unit cycle (k=3). If compensation is insufficient even when N is 3, the adjustment period may be further prolonged. When the adjustment period is prolonged in this way, phase detection can be carried out even under the condition in the second embodiment, in which detection has been aborted.

Fourth Embodiment

Figure 6:
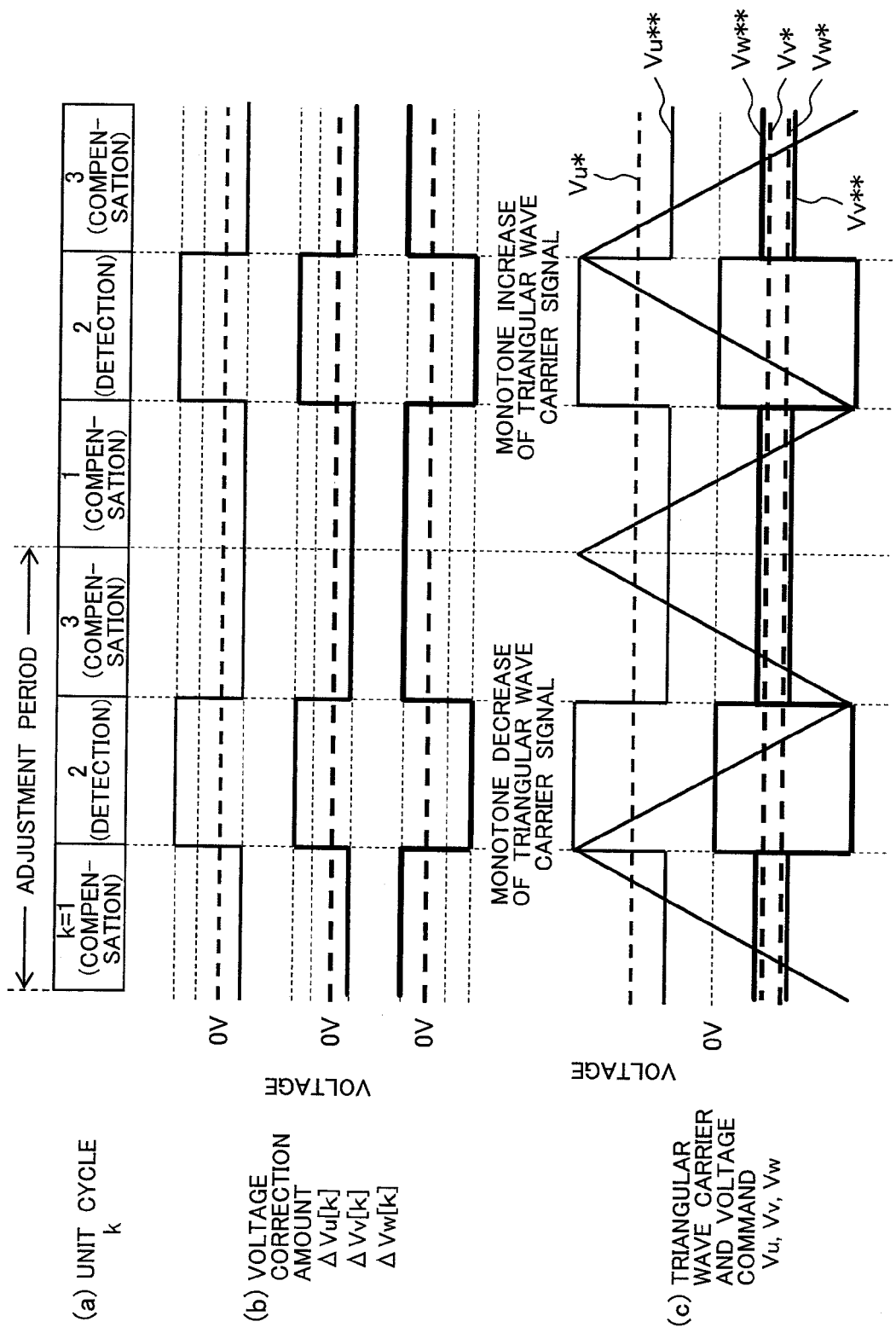
FIG. 6 illustrates a relation between DC bus conductor current and three-phase voltages in a fourth embodiment of the present invention.

FIG. 6 illustrates a relation between the DC bus conductor current and three-phase voltages in a fourth embodiment of the present invention. This embodiment is characterized in that the number N of unit cycles that determine the adjustment period is an odd number and a unit cycle in which detection is carried out is placed at the center of the adjustment period. FIG. 6 illustrates a case in which N is 3. The unit cycle for which k is 2 is the detection period, and the unit cycles for which k is 1 and 3 are the compensation cycles. The calculation of the voltage command correction amount in each detection period is carried out by using the method in the first embodiment, and the calculation of the correction amount in each compensation period is carried out by using the method in the second embodiment, so the following equations are set.

$$\Delta V1[1]=\Delta V1[3]=-\Delta V10/2 \qquad (19)$$

$$\Delta V1[1]=\Delta V2[3]=-\Delta V20/2 \qquad (20)$$

$$\Delta V1[1]=\Delta V3[3]=-\Delta V30/2 \qquad (21)$$

If the voltage command exceeds Vmax or falls below Vmin during a compensation period, the method in the second embodiment or the method in the third embodiment is similarly used.

Since an odd multiple of the unit cycle constitutes the adjustment period in this way, detection cycles are alternately assigned to monotone increasing periods and monotone decreasing periods of the triangular wave carrier, so the effect of a current ripple caused by PWM on current detection error can be lessened and highly precise detection can be thereby achieved.

Since detection is carried out at the central unit cycle, the width of variations in the amount of control can be suppressed to a small value in that range, and control superior in safety can be achieved.

Fifth Embodiment

Next, the fifth embodiment of the present invention will be described. Although, in the fourth embodiment illustrated in FIG. 6, compensation amounts have been calculated in the compensation periods as represented by equations (19) to (21), the fifth embodiment differs in that compensation amounts are calculated as follows.

$$\Delta V1[1]=-\Delta V10 \times m \qquad (22)$$

$$\Delta V1[3]=-\Delta V10 \times (1-m) \qquad (23)$$

$$\Delta V2[1]=-\Delta V20 \times m \qquad (24)$$

$$\Delta V2[3]=-\Delta V20 \times (1-m) \qquad (25)$$

$$\Delta V3[1]=-\Delta V30 \times m \qquad (26)$$

$$\Delta V3[3]=-\Delta V30 \times (1-m) \qquad (27)$$

Here, m is a positive real number greater than 0 but smaller than 1. If m is 0.5, a match with the fourth embodiment is obtained. In the fifth embodiment, m is a value larger than 0.5 (0.75, for example) or the like.

Figure 7:
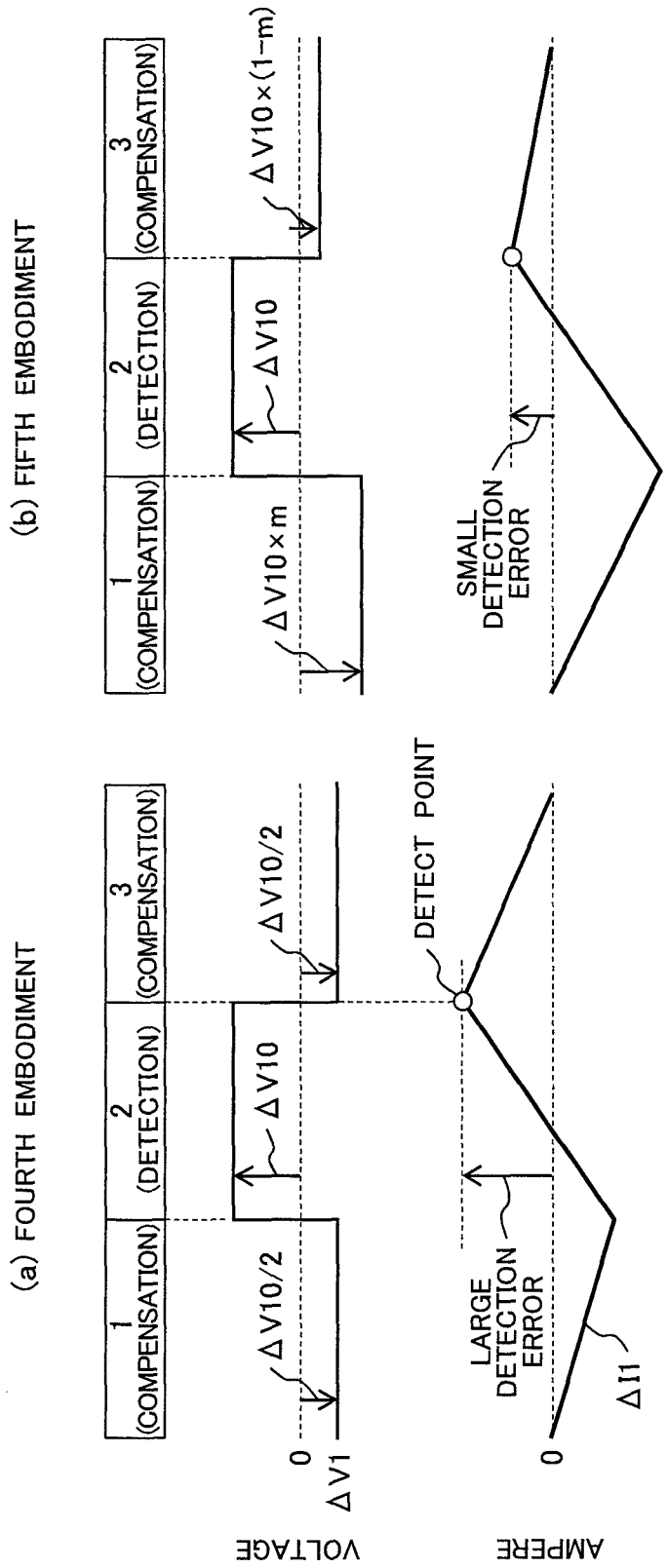
FIG. 7 illustrates a relation between the amount of voltage compensation and a current harmonic wave attributable to it in a fifth embodiment of the present invention.

FIG. 7 schematically illustrates the advantages of the fifth embodiment in comparison with the fourth embodiment, representing the harmonic component of the maximum phase current I1 resulting from the correction of the maximum voltage phase. In the fourth embodiment, the compensation amounts are symmetric with respect to the detection cycle, so the resulting harmonic components are also symmetric. Since the current detection timing is at the end of the detection cycle, current is detected at a peak of the harmonic component as a result, so error is caused. By contrast, in the fifth embodiment, the compensation amount in the unit cycle for which k is 1 is large, so the value of the peak at the detection point can be suppressed to a small value. Accordingly, the current detection error can be lessened.

When the compensation amounts in the compensation periods are made asymmetrical as described above, current detection error caused by the harmonic component resulting from voltage compensation can be suppressed and higher precise motor control characteristic can be obtained.

Sixth Embodiment

Figure 8:
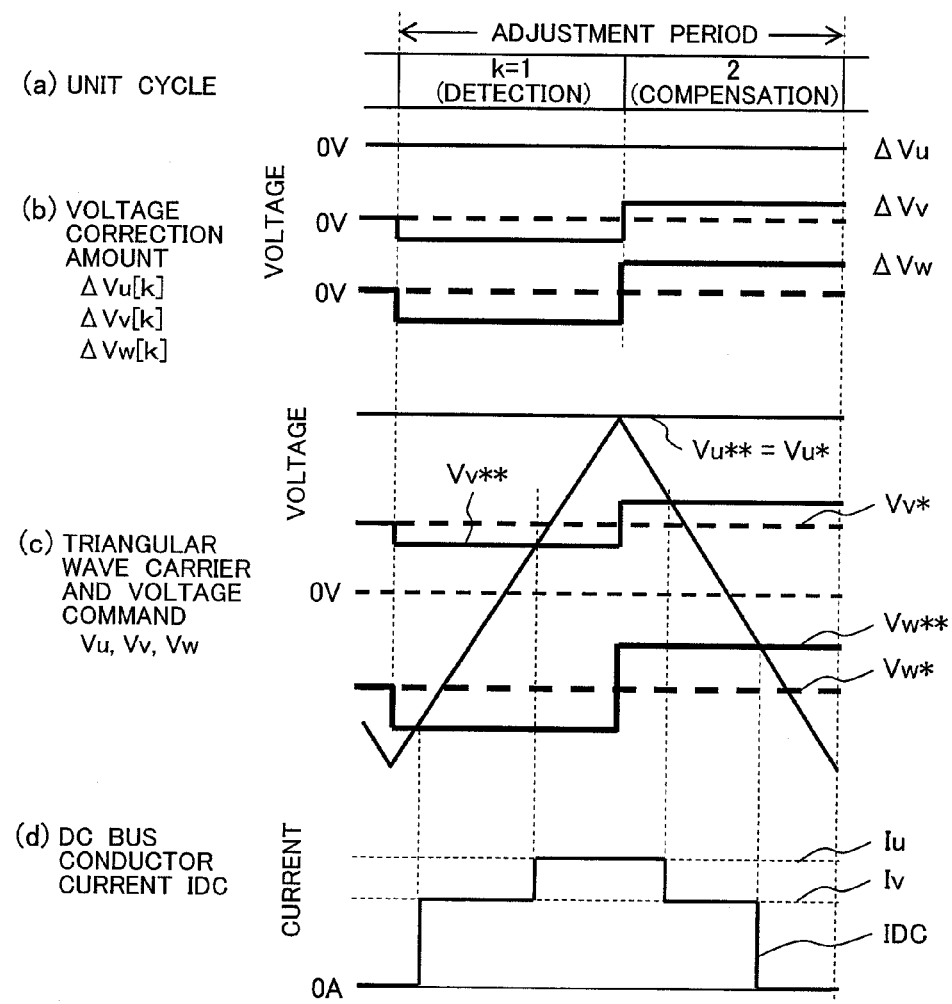
FIG. 8 illustrates a relation between DC bus conductor current and three-phase voltages in a sixth embodiment of the present invention.

FIG. 8 illustrates a relation between the DC bus conductor current and three-phase voltages in a sixth embodiment of the present invention. In this embodiment, the present invention is applied to two-phase modulation.

It is known that to reduce the energy loss of a switching element in the main circuit of a power converter by reducing the number of operations of the switching element, switching operation for one phase of the three phases is eliminated and the motor is driven by switching operation for only the remaining two phases. This method is referred to as two-phase modulation. By contrast, ordinary modulation methods as described in the first to fourth embodiments are referred to as three-phase modulation.

In general, two-phase modulation is achieved by holding the maximum voltage phase V1 in a switch-on state or by holding the minimum voltage phase in a switch-off state. As the internal operation of the microcomputer 6, the maximum phase or minimum phase is set outside the amplitude range of the triangular wave carrier signal. From the viewpoint of the general appearance of waveforms, this is referred to as a maximum phase holding or minimum phase holding. Furthermore, a voltage phase in which the switch state is fixed is referred to as a held phase.

In two-phase modulation, the waveform of the DC bus conductor current IDC changes, in comparison with the three-phase modulation method.

FIG. 8 illustrates a case in which Vu is held to the maximum phase. In this case, the voltage maximum phase current flows in the DC bus conductor current IDC across the monotone increasing period and monotone decreasing period of the triangular wave carrier signal. Therefore, the time during which the maximum phase current flows is apparently twice the value that is generally conceivable from the line voltage V12, so the pulsed current of the held phase can be detected if the voltage between lines including the held phase line is at least half Vpw, which is the conventional necessary condition.

Accordingly, in a normal environment, the pulsed current of the held phase can be detected without having to carry out voltage command correction.

In an environment in which Vpw is large, however, the voltage between lines including the held phase line (V12 in FIG. 8**) is not sufficient, a situation in which the phase current cannot be detected occurs. In this case, when the intermediate phase is corrected by the same process as in the first embodiment, current detection becomes possible. The problem of the saturation of the second voltage command in a compensation period can also be solved by the same method as in the second and third embodiments.

As described above, even in an environment in which the pulsed current in the held phase cannot be detected in two-phase modulation, the sixth embodiment enables the phase current to be detected and makes highly precise motor control possible with less power conversion device loss.

Seventh Embodiment

Figure 9:
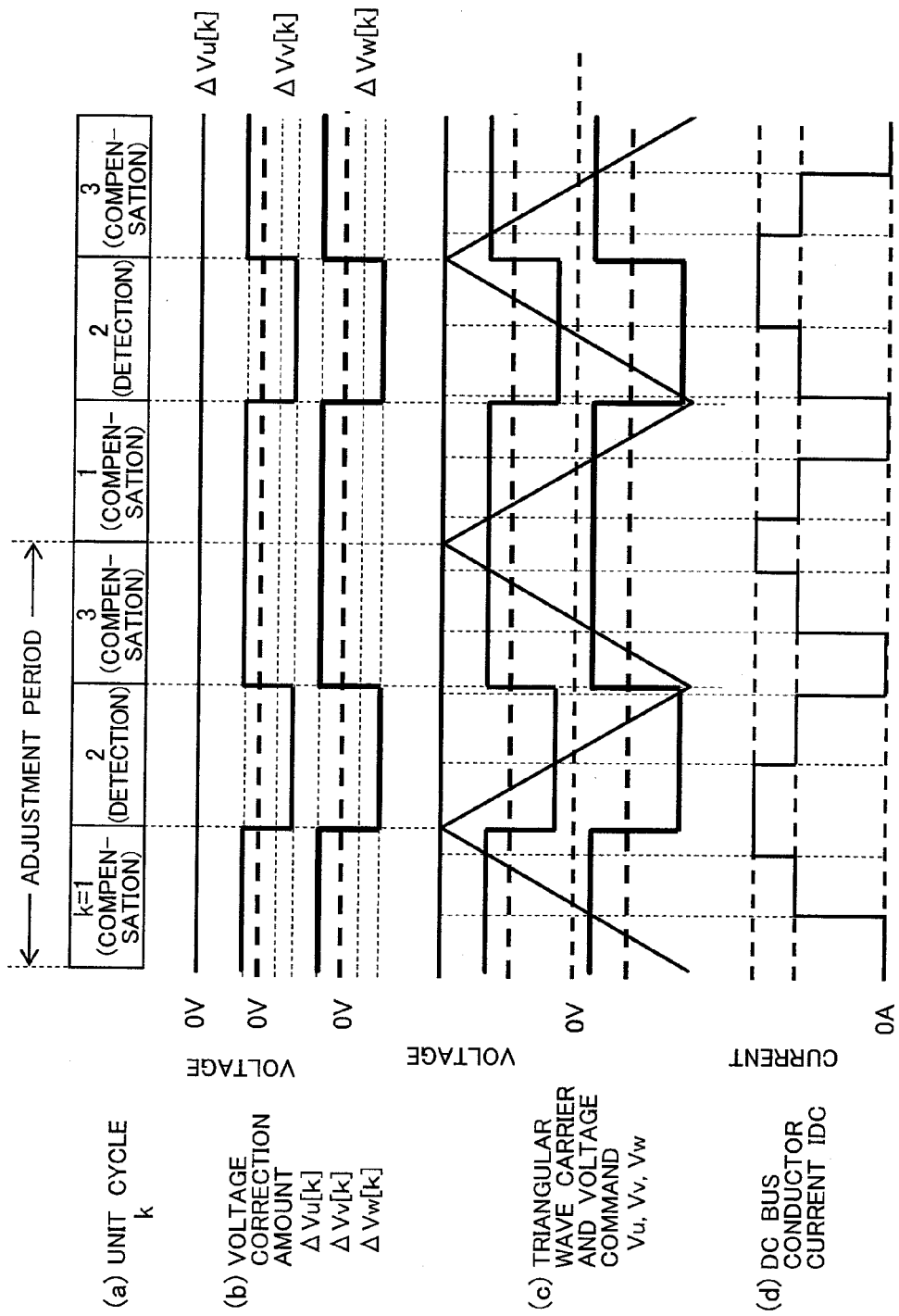
FIG. 9 illustrates a relation between DC bus conductor current and three-phase voltages in a seventh embodiment of the present invention.

FIG. 9 illustrates a relation between the DC bus conductor current and three-phase voltages in a seventh embodiment of the present invention.

In two-phase modulation as well, when an odd multiple of the unit cycle constitutes the adjustment period and the detection period is at the center of the adjustment period, precision can be improved. If current detection is carried out in consideration that the pulsed current flows across unit cycles as described in the sixth embodiment, however, the detection timing of the held phase is substantially limited to the monotone increasing period or monotone decreasing period of the triangular wave carrier. Therefore, the advantages of improved precision obtained in the fourth embodiment are lessened.

Accordingly, in the seventh embodiment, a voltage command correction amount is determined in each unit cycle so as to satisfy equation (1), without regard to the voltage maximum phase current flow across the monotone increasing period and monotone decreasing period of the triangular wave carrier signal.

According to the above method, further highly precise current detection is possible with less power conversion device loss.

Eighth Embodiment

When the difference between the upper voltage limit Vmax and the lower voltage limit Vmin is smaller than twice the necessary line voltage Vpw and equation (28) holds, equation (1) is not originally satisfied, so phase current detection from the DC bus conductor current IDC is impossible.

$$Vmax - Vmin < 2Vpw \tag{28}$$

As is clear from FIG. 2, when the triangular wave carrier frequency is reduced, Vpw for the same Tpw can be reduced. Therefore, even if equation (28) is satisfied, the motor can be controlled by setting a triangular wave carrier frequency that satisfies equation (28).

Ninth Embodiment

Figure 10:
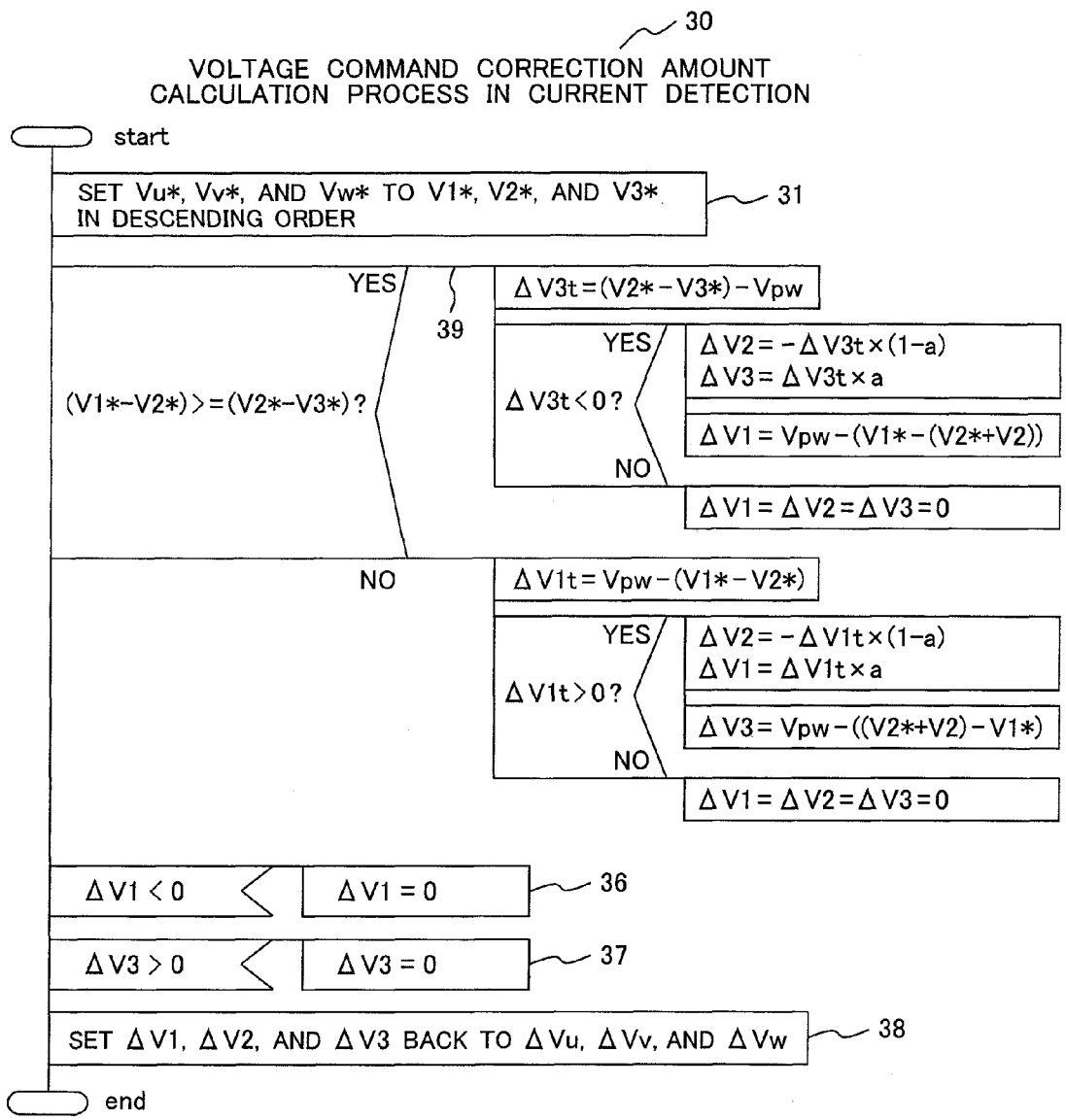
FIG. 10 illustrates a processing flow in a voltage command correction amount arithmetic unit in the ninth embodiment of the present invention.

FIG. 10 illustrates a processing flow in a voltage command correction amount arithmetic unit in the ninth embodiment of the present invention. This embodiment differs from the first embodiment; in the first embodiment, the intermediate phase has not been corrected ($\Delta V2=0$) in process 32, which is carried out when two phases can be detected due to voltage correction. However, the ninth embodiment differs in that the intermediate phase shares part of the necessary correction amount of $\Delta V1$ and $\Delta V3$, whichever is larger. This will be described below with reference to FIG. 10.

V12* is compared with V23*, and which of the maximum phase and minimum phase requires a larger correction amount is determined. A case in which V12* is larger will be described below as an example. The necessary correction amount is larger on the minimum phase side $\Delta V3$, when compared with the maximum phase side $\Delta 1$. When the necessary correction amount is denoted $\Delta 3t$, it is obtained from the following equation.

$$\Delta V3t = (V2^* - V3^*) - Vpw \tag{29}$$

The necessary correction amount $\Delta V3t$ is shared by the minimum phase and intermediate phase and correction is then carried out. For example, a certain value "a" ("a" is a constant larger than 0 but smaller than 1, which is 0.5, for example) is used to set the following equations.

$$\Delta V2 = -\Delta V3t \times (1-a) \tag{30}$$

$$\Delta V3 = \Delta V3t \times a \tag{31}$$

V12 is further reduced by an amount by which the intermediate phase has been corrected, so the maximum phase correction amount is corrected by the following equation.

$$\Delta V1 = Vpw - (V1^* - (V2^* + V2)) \tag{32}$$

When $\Delta V3t$ is positive, $\Delta V23$ is larger than Vpw without having to carrying out voltage correction. Furthermore, since it has been known that $\Delta V12$ is larger than $\Delta V23$, current detection is possible without having to correct all phase voltages.

Although not illustrated in FIG. 10, if the maximum phase voltage command value exceeds the upper voltage limit or the minimum phase voltage command value falls below the lower voltage limit after voltage correction has been carried out by this process, the correction amount may be determined as in process 33 or process 34 by the same way as in the first embodiment.

When the three phases share the voltage correction amount in this process, the correction amount for one phase is reduced and the high-frequency ripple of current is reduced, so noise can be suppressed and the operation efficiency of the motor can be increased.

What is claimed is:

1. A power conversion device comprising:
    a pulse width modulating unit configured to convert three-phase voltage commands to a PWM pulse by comparing the voltage commands with a triangular wave carrier signal;
    a power converter configured to convert between a DC voltage and a three-phase AC voltage by driving a switching element according to the PWM pulse;

a current detecting unit configured to detect a pulsed current flowing through a DC bus conductor of a main circuit in the power converter; and a voltage command correcting unit configured to:
- correct voltage commands for a maximum phase and a minimum phase so that two line voltages between the maximum phase and an intermediate phase and between the intermediate phase and the minimum phase are each equal to or larger than a predetermined value, the maximum phase being a phase having the largest value when momentary values of the three-phase voltage commands are arranged in descending order, the intermediate phase being a phase having the second largest value, the minimum phase being a phase having the third largest value, and
- to correct the voltage command for the intermediate phase, under a predetermined condition, the predetermined condition being set so that when the voltage command value for the maximum phase or the minimum phase is corrected, one of the voltage command for the maximum phase after the correction and the voltage command for the minimum phase after the correction reaches an upper limit or a lower limit of voltage command values, and one of the two line voltages is smaller than the predetermined value, and that when the predetermined condition holds, the intermediate phase is corrected by an amount equal to a shortage in a necessary correction amount.

2. A power conversion device comprising:
a pulse width modulating unit configured to convert three-phase voltage commands to a PWM pulse by comparing the voltage commands with a triangular wave carrier signal;
a power converter configured to convert between a DC voltage and a three-phase AC voltage by driving a switching element according to the PWM pulse;
a current detecting unit configured to detect a pulsed current flowing through a DC bus conductor of a main circuit in the power converter; and
a voltage command correcting unit configured to correct voltage commands for a maximum phase and a minimum phase so that two line voltages between the maximum phase and an intermediate phase, and between the intermediate phase and the minimum phase, are each equal to or larger than a predetermined value, the maximum phase being a phase having the largest value when momentary values of the three-phase voltage commands are arranged in descending order, the intermediate phase being a phase having the second largest value, the minimum phase being a phase having the third largest value;
wherein when the voltage command value for the maximum phase or the minimum phase is corrected, a correction amount for a side on which the absolute value of a voltage correction value is larger is reduced at a fixed rate, and the intermediate phase is corrected by an amount equal to a reduced correction amount.

3. The power conversion device according to claim 1 or 2, wherein the predetermined value for the line voltages, which is obtained by the voltage command correcting unit, is a voltage value necessary to assure a flow time of the pulsed current flowing through the DC bus conductor, the flow time being equal to or longer than a time taken by the current detecting unit to detect the current flowing through the DC bus conductor.

4. The power conversion device according to claim 1 or 2, wherein the predetermined value for the line voltages, which is obtained by the voltage command correcting unit, is a voltage value necessary to assure a flow time of the pulsed current flowing through the DC bus conductor, the flow time being equal to or longer than a sum of a sample hold time taken by the current detecting unit to detect the current flowing through the DC bus conductor and a period during which ringing noise caused by a switching element lasts.

5. The power conversion device according to claim 1 or 2, wherein an arrangement is made so that the voltage command correcting unit corrects the voltage command by taking a half cycle of a triangular wave carrier signal as a unit cycle and that an average of voltage command correction amounts in a period extending over an integer multiple of the unit cycle is zero or substantially zero.

6. The power conversion device according to claim 5, wherein the period in which the average of the voltage command correction amounts is zero or substantially zero is set to an odd multiple of the unit cycle.

7. The power conversion device according to claim 5, wherein the period in which the average of the voltage command correction amounts is zero or substantially zero is set to an odd multiple of the unit cycle, and a current is detected in a central unit cycle of the period.

8. The power conversion device according to claim 1 or 2, wherein the pulse width modulating unit includes a two-phase modulation unit configured to stop a switching operation of any one of the three phases and drives switching elements of the remaining two phases.

9. The power conversion device according to claim 1 or 2, further comprising a carrier frequency switching unit configured to reduce a frequency of the triangular wave carrier signal when a difference between the upper limit and the lower limit of the voltage commands is smaller than twice the predetermined value.

10. A method of controlling a power conversion device, the method including the steps of:
converting three-phase voltage commands to a PWM pulse by comparing the voltage commands with a triangular wave carrier signal;
performing power conversion between a DC voltage and a three-phase AC voltage by driving a switching element in a power converter according to the PWM pulse;
detecting a pulsed current flowing through a DC bus conductor of a main circuit in the power converter;
correcting the three-phase voltage commands; and
correcting voltage commands for a maximum phase and a minimum phase so that a line voltage between the maximum phase and an intermediate phase and a line voltage between the intermediate phase and the minimum phase are each equal to or larger than a predetermined value, the maximum phase being a phase having the largest value when momentary values of the three-phase voltage commands are arranged in descending order, the intermediate phase being a phase having the second largest value, the minimum phase being a phase having the third largest value; and
correcting the voltage command for the intermediate phase, when a deviation from the upper limit or the lower limit of the voltage commands occurs when the voltage command value for the maximum phase or the minimum phase is corrected in the step of correcting the voltage commands for the maximum phase and the minimum phase.

11. The method of controlling a power conversion device according to claim 10, wherein the predetermined value for the line voltage value is a minimum line voltage that is required to set a pulse width of a DC input current flowing through a DC bus conductor to a prescribed width or more.

* * * * *